April 23, 1940.                 C. BARBIERI                    2,197,782
                         CONTAINER MAKING MACHINE
                    Filed Sept. 25, 1937        12 Sheets-Sheet 1
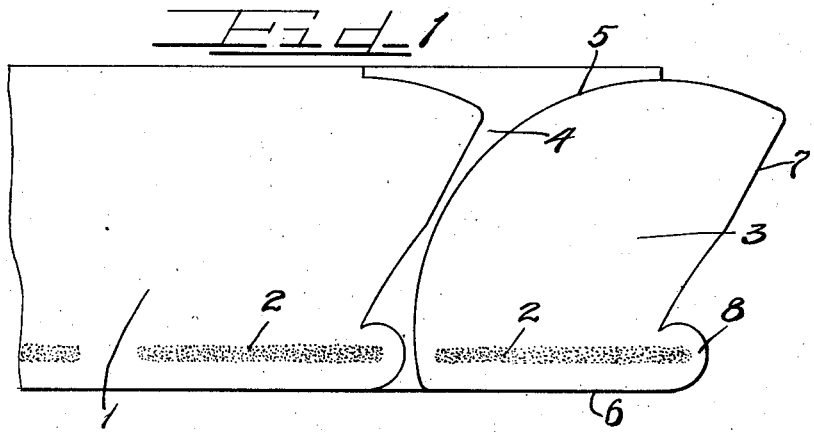
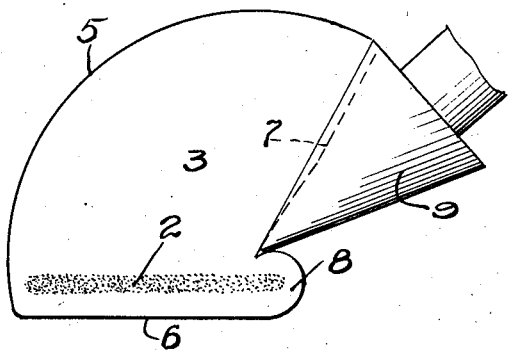
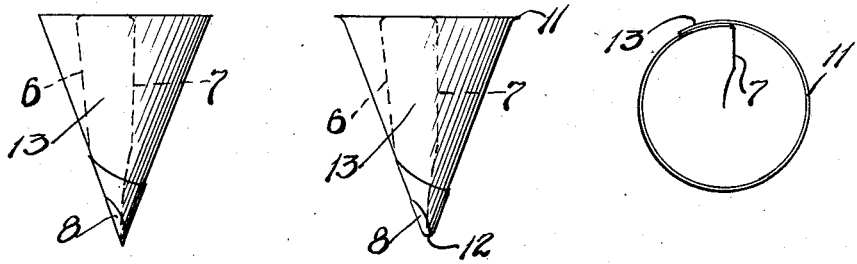
Inventor
Cesare Barbieri
by Charles Hill
Attys.

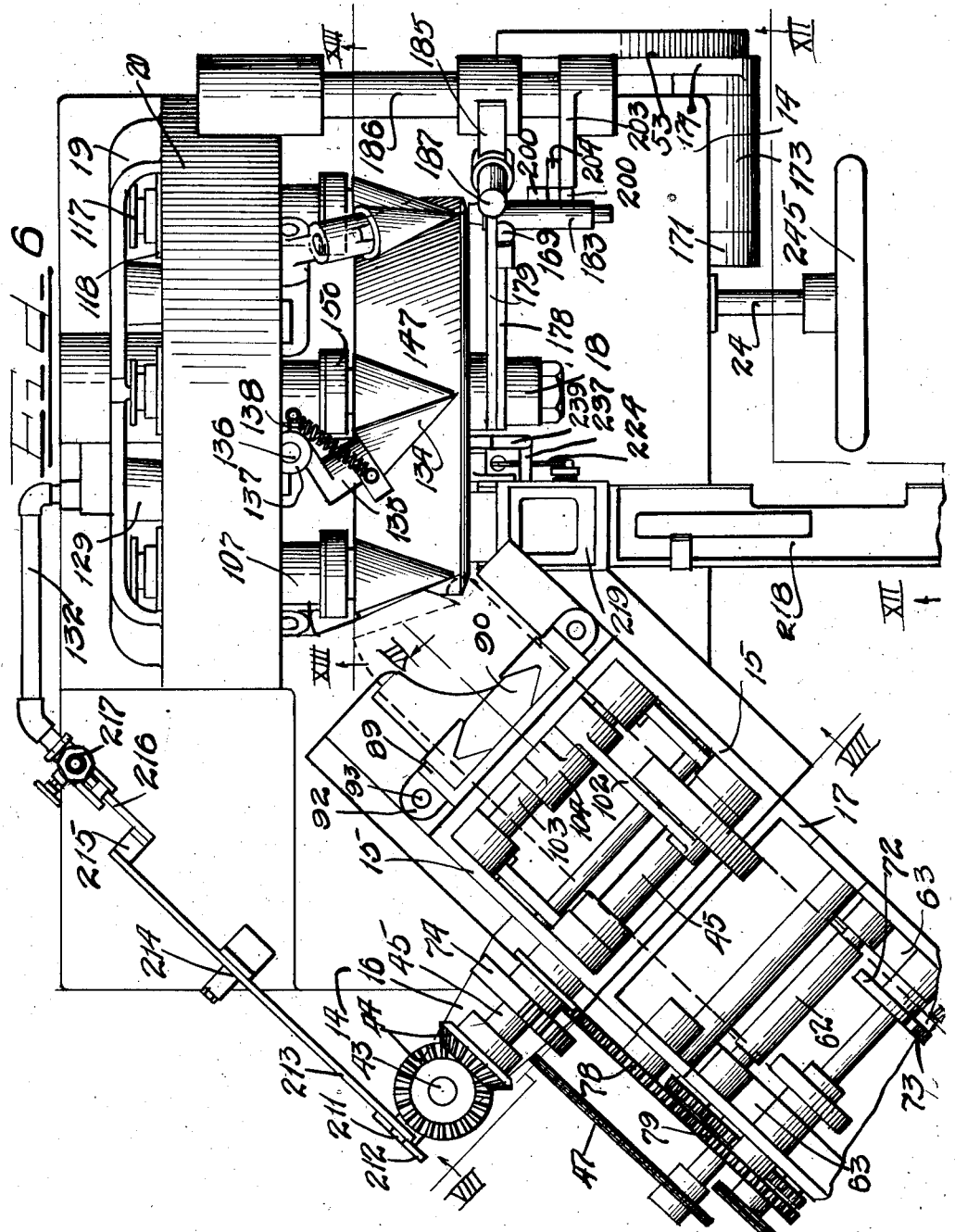

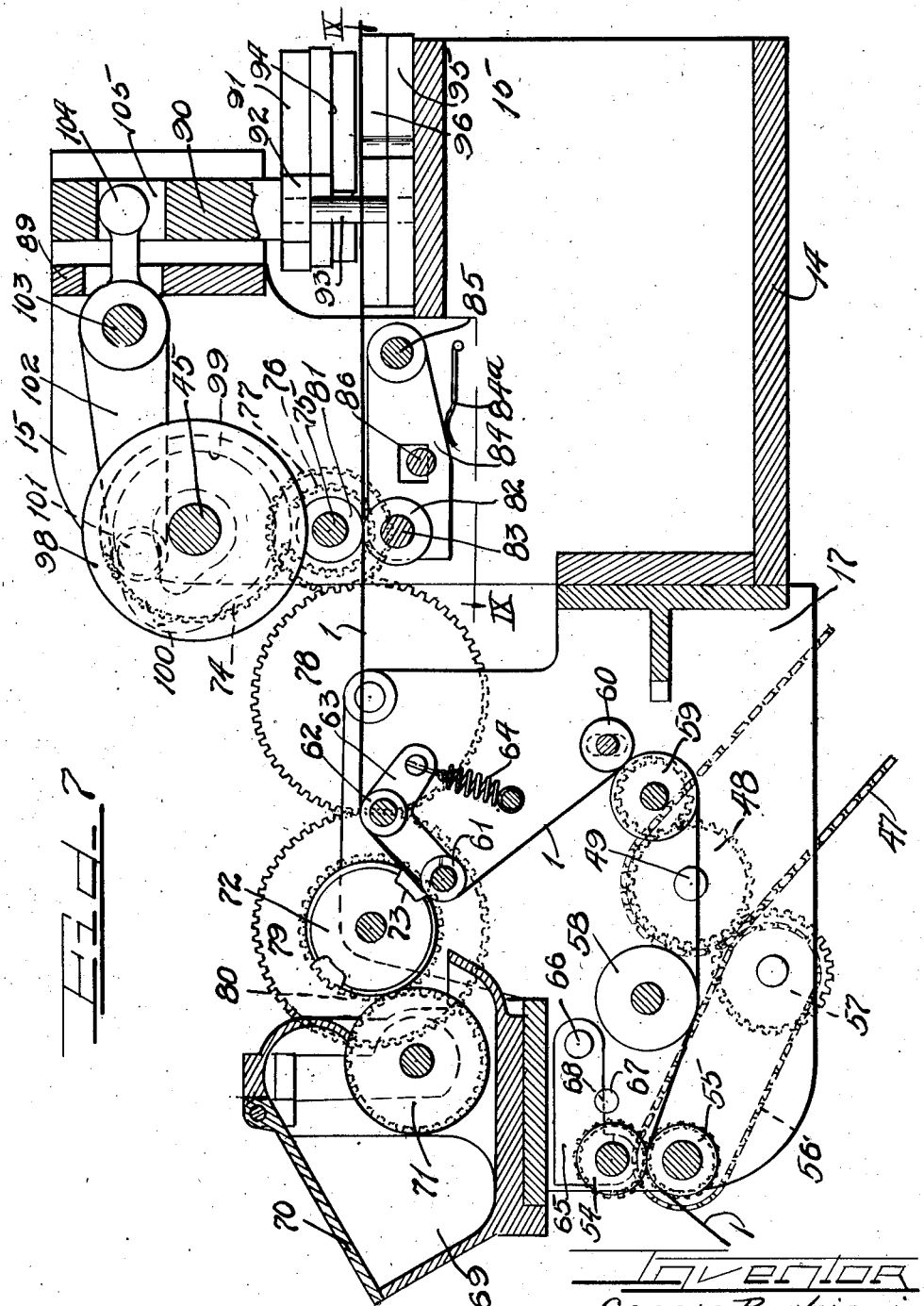

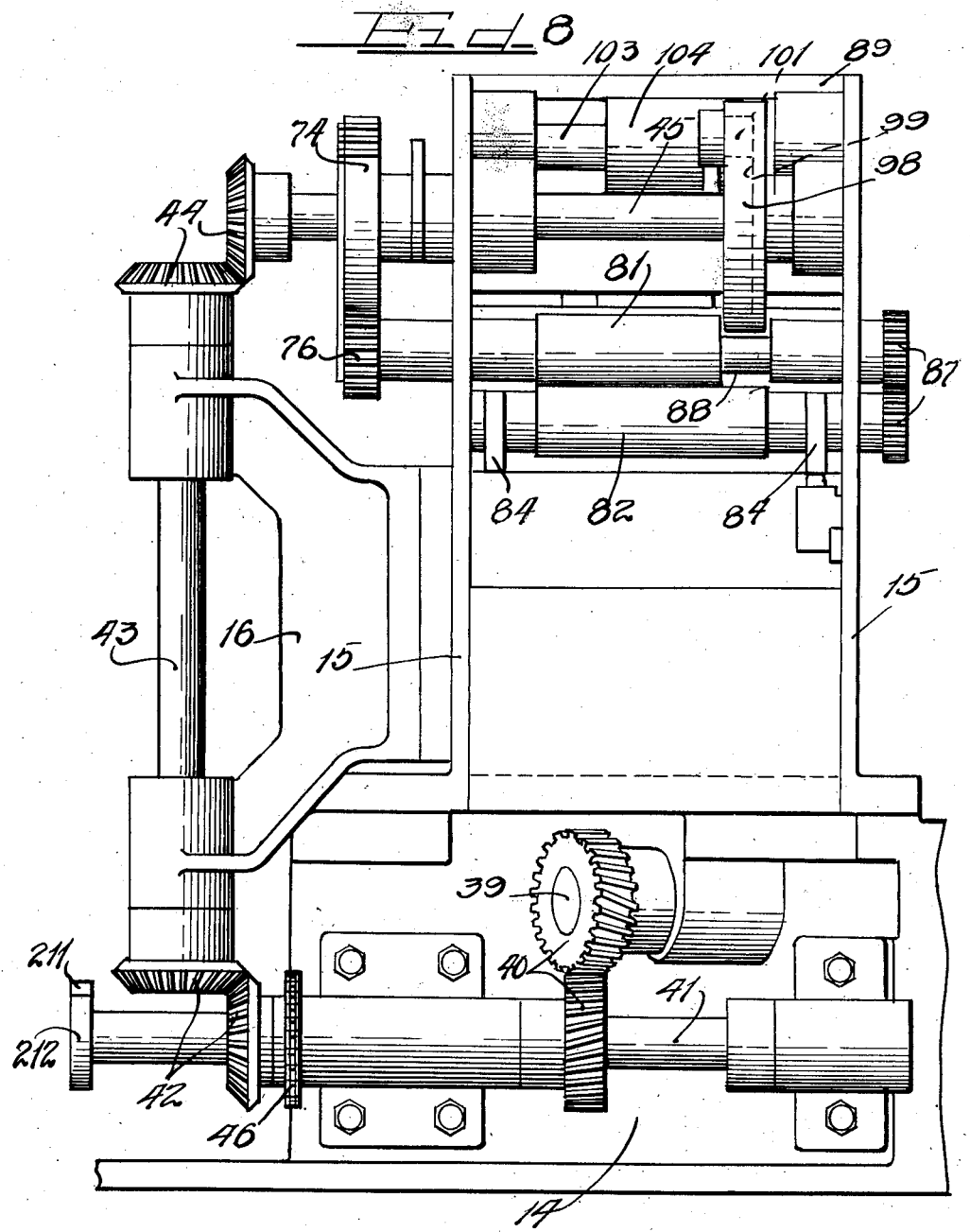

April 23, 1940.  C. BARBIERI  2,197,782
CONTAINER MAKING MACHINE
Filed Sept. 25, 1937  12 Sheets-Sheet 5
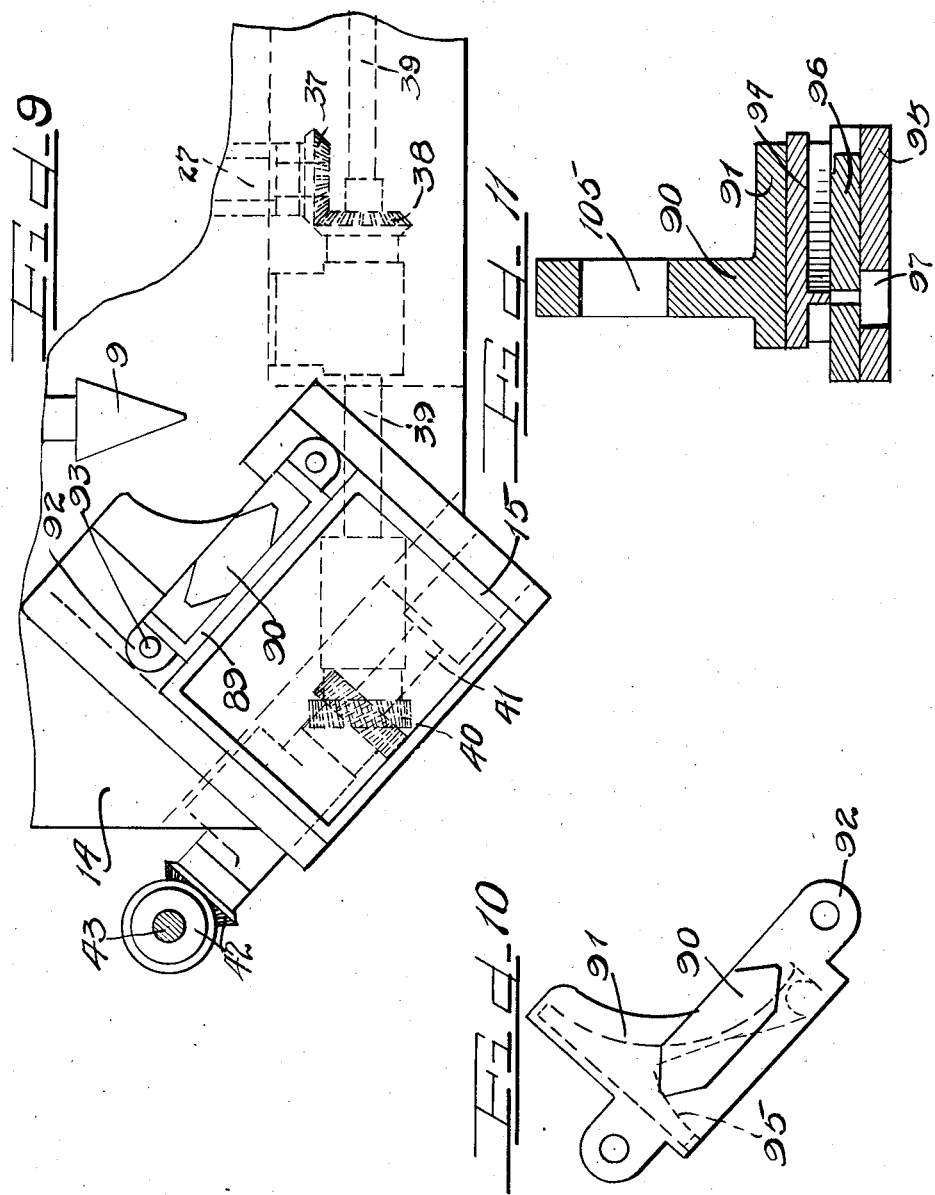
Inventor
Cesare Barbieri
by Charles...
Attys.

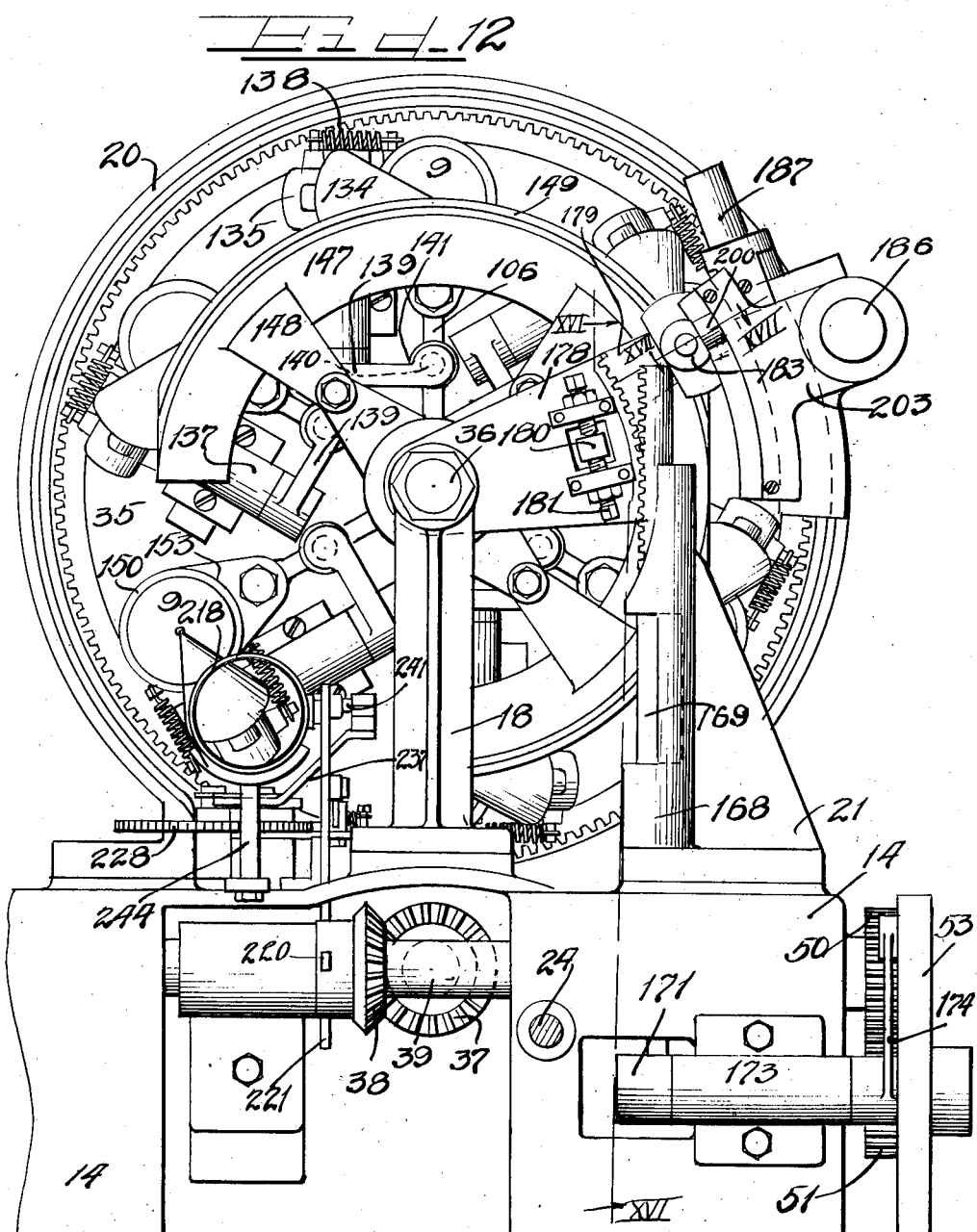

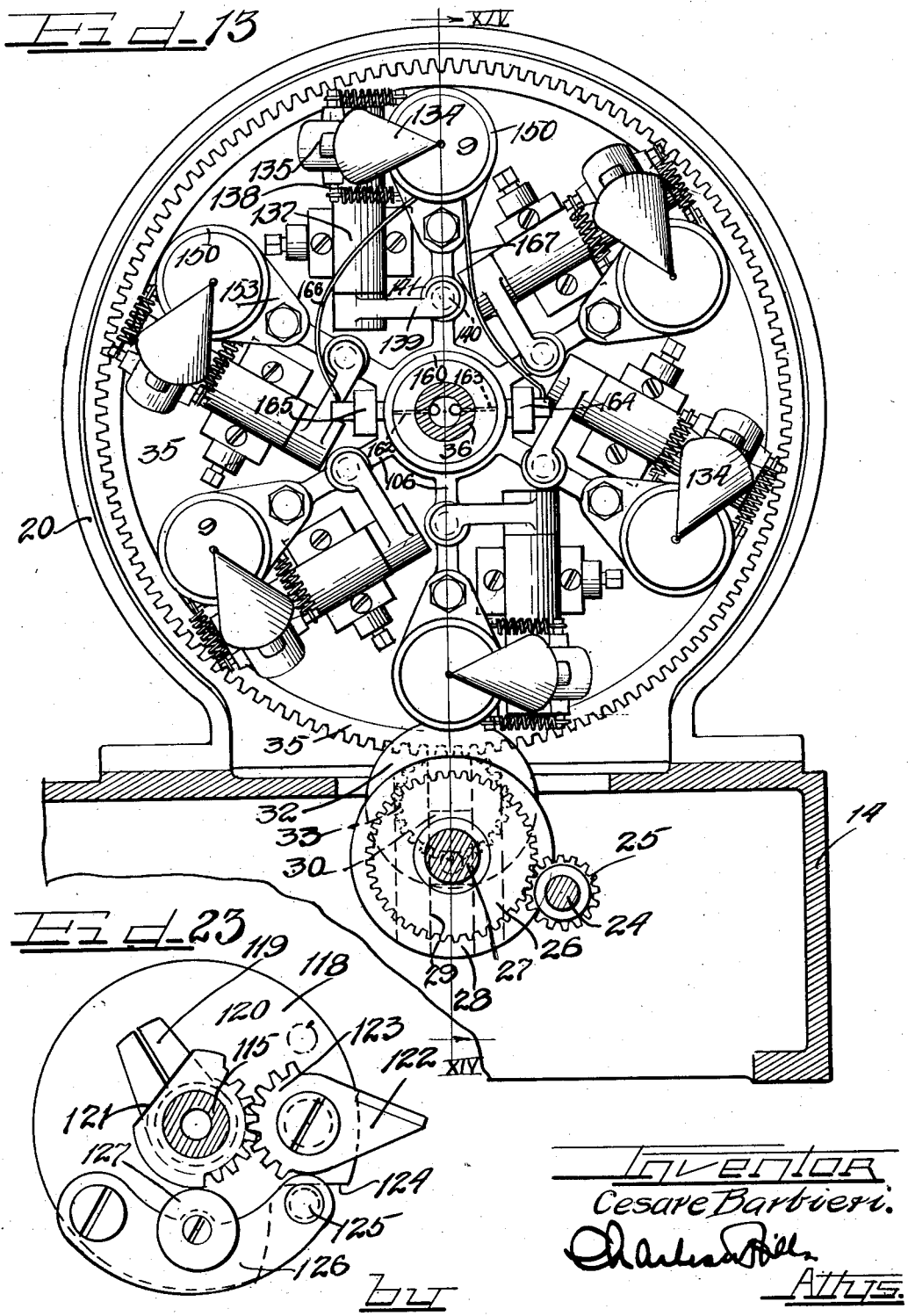

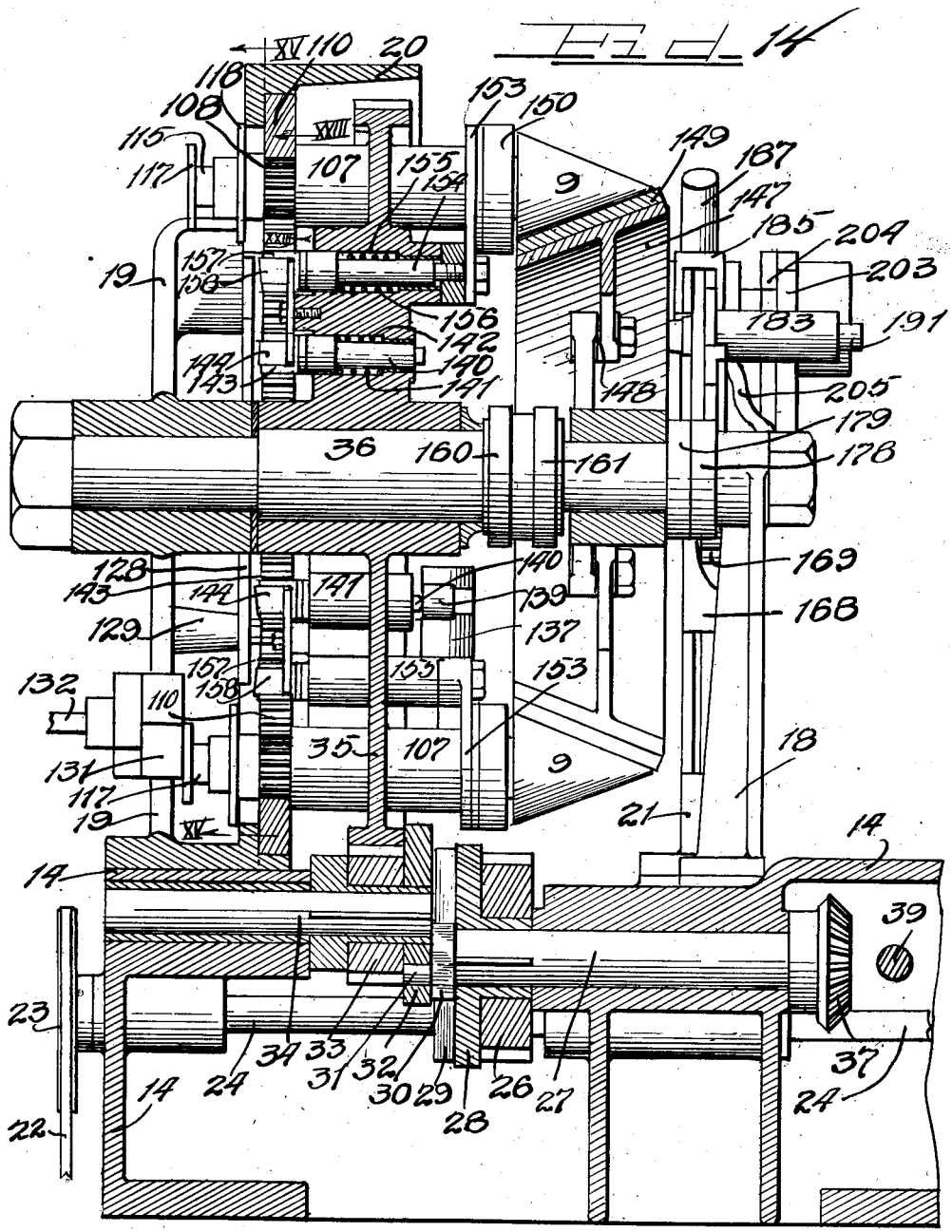

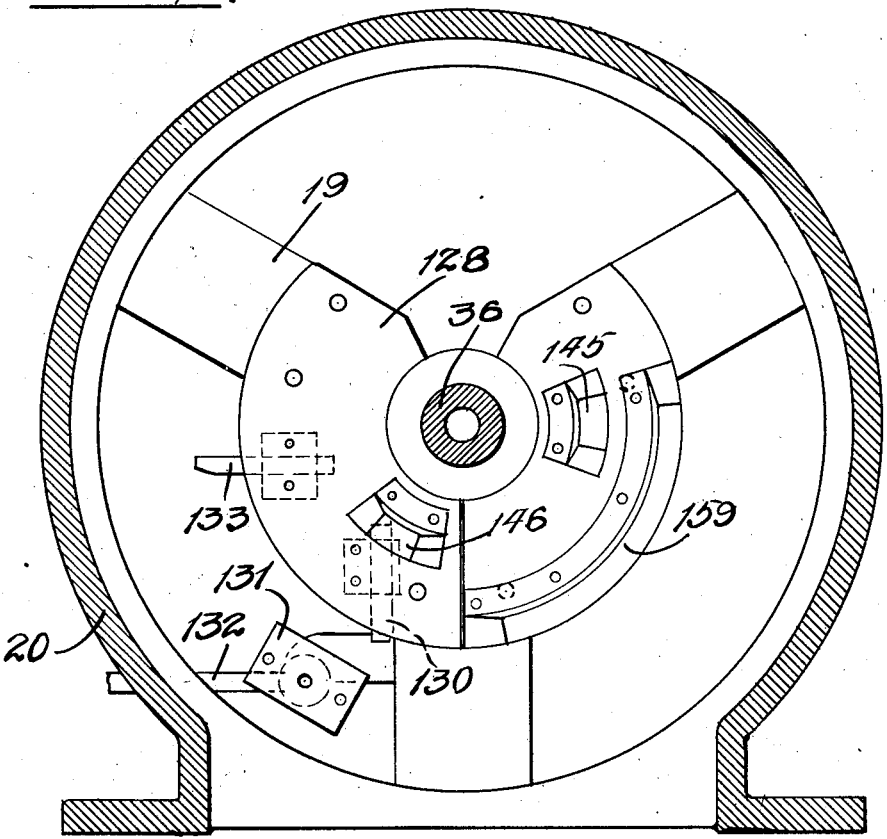
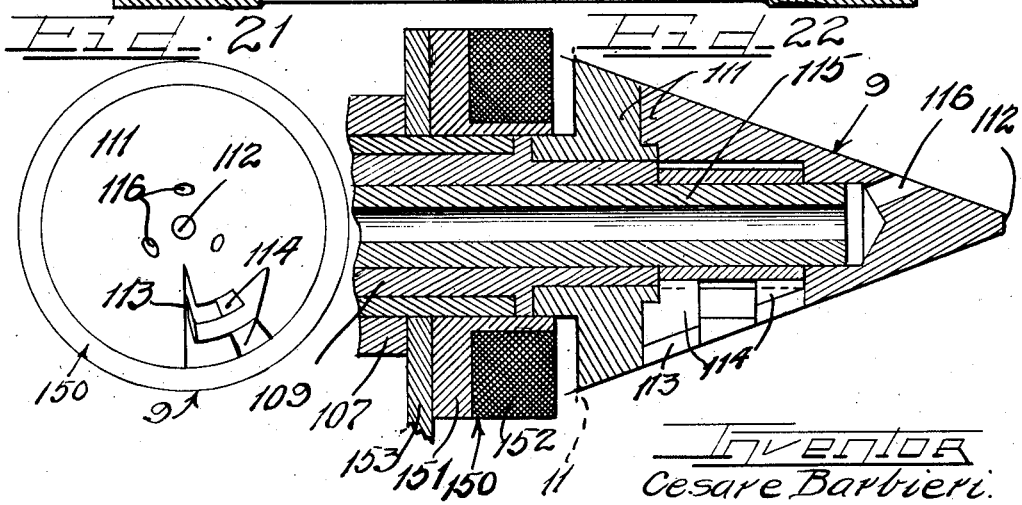

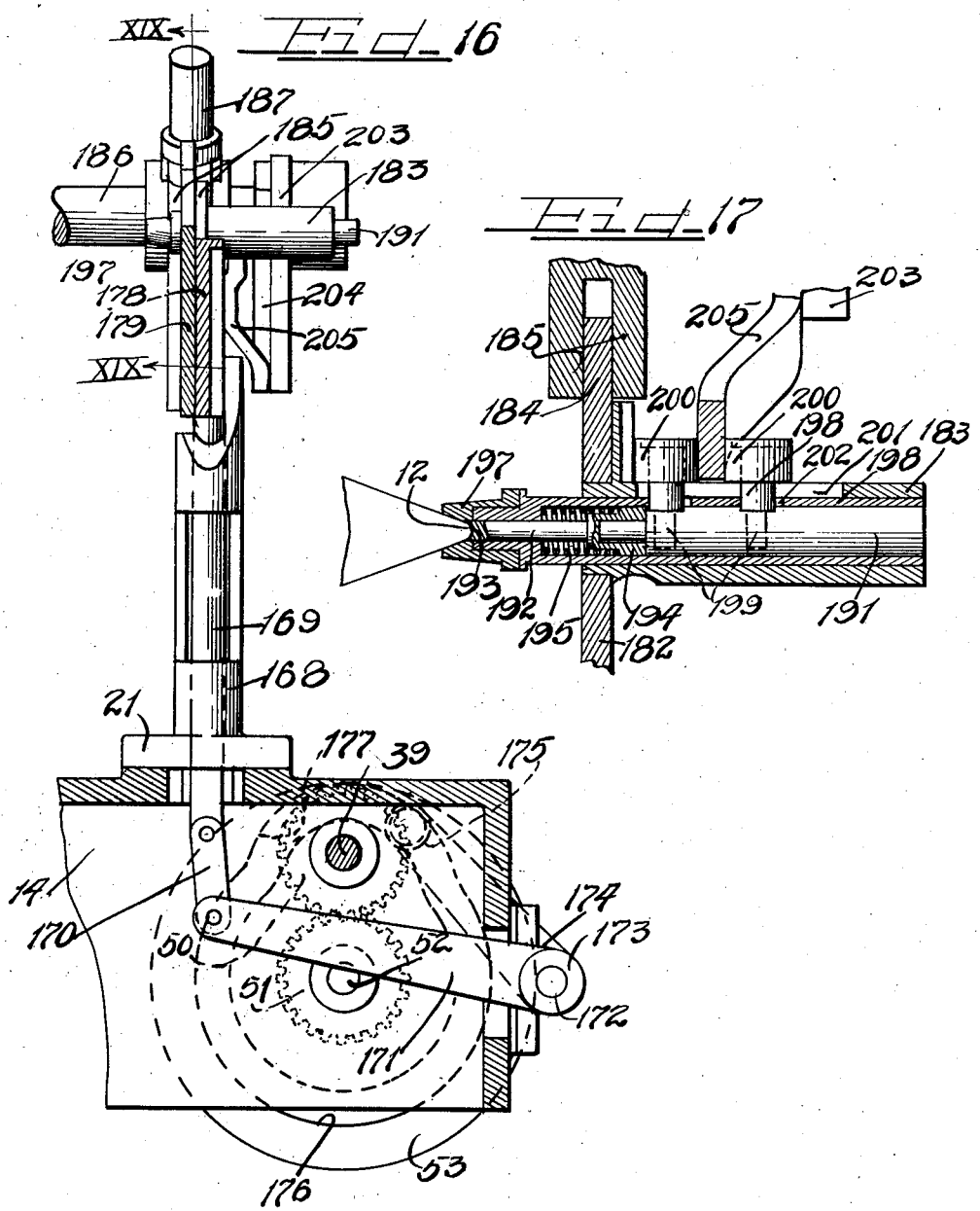

April 23, 1940.                C. BARBIERI                2,197,782
                         CONTAINER MAKING MACHINE
                    Filed Sept. 25, 1937        12 Sheets-Sheet 11
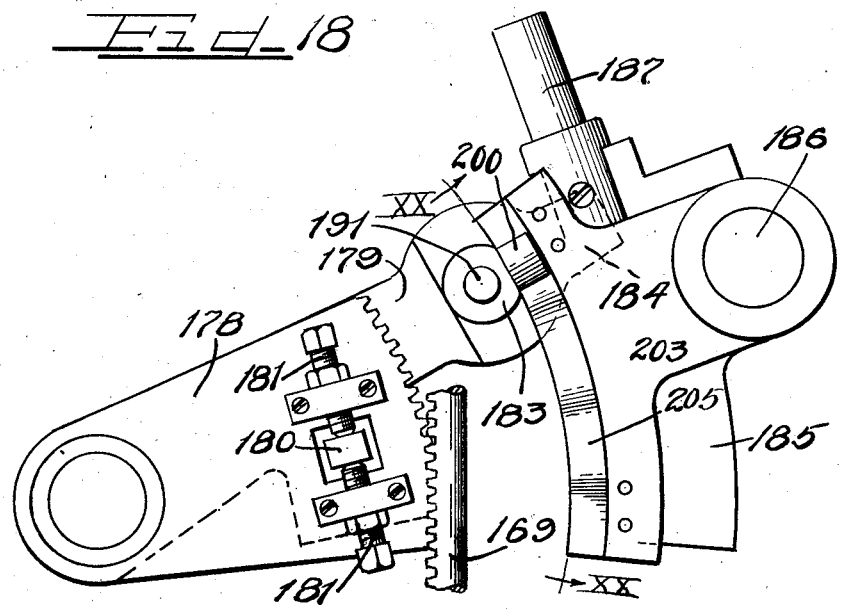
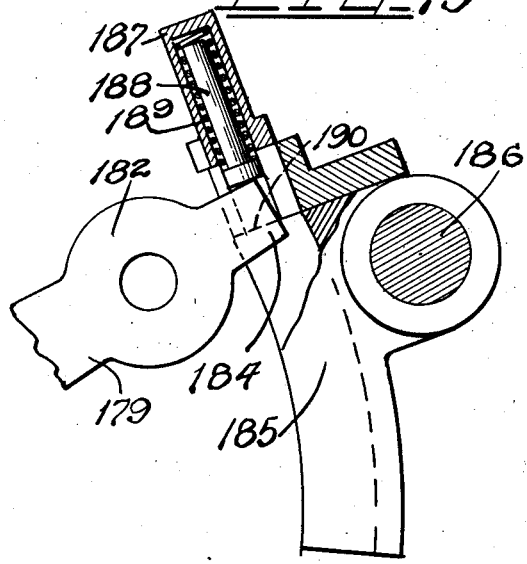
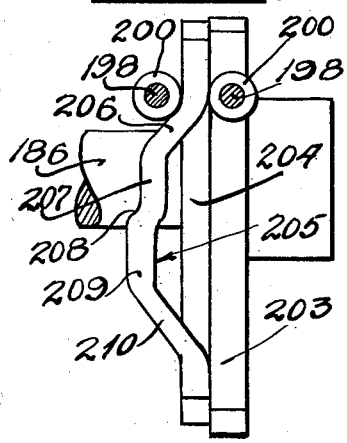
Inventor
Cesare Barbieri
by Charles ———
Attys.

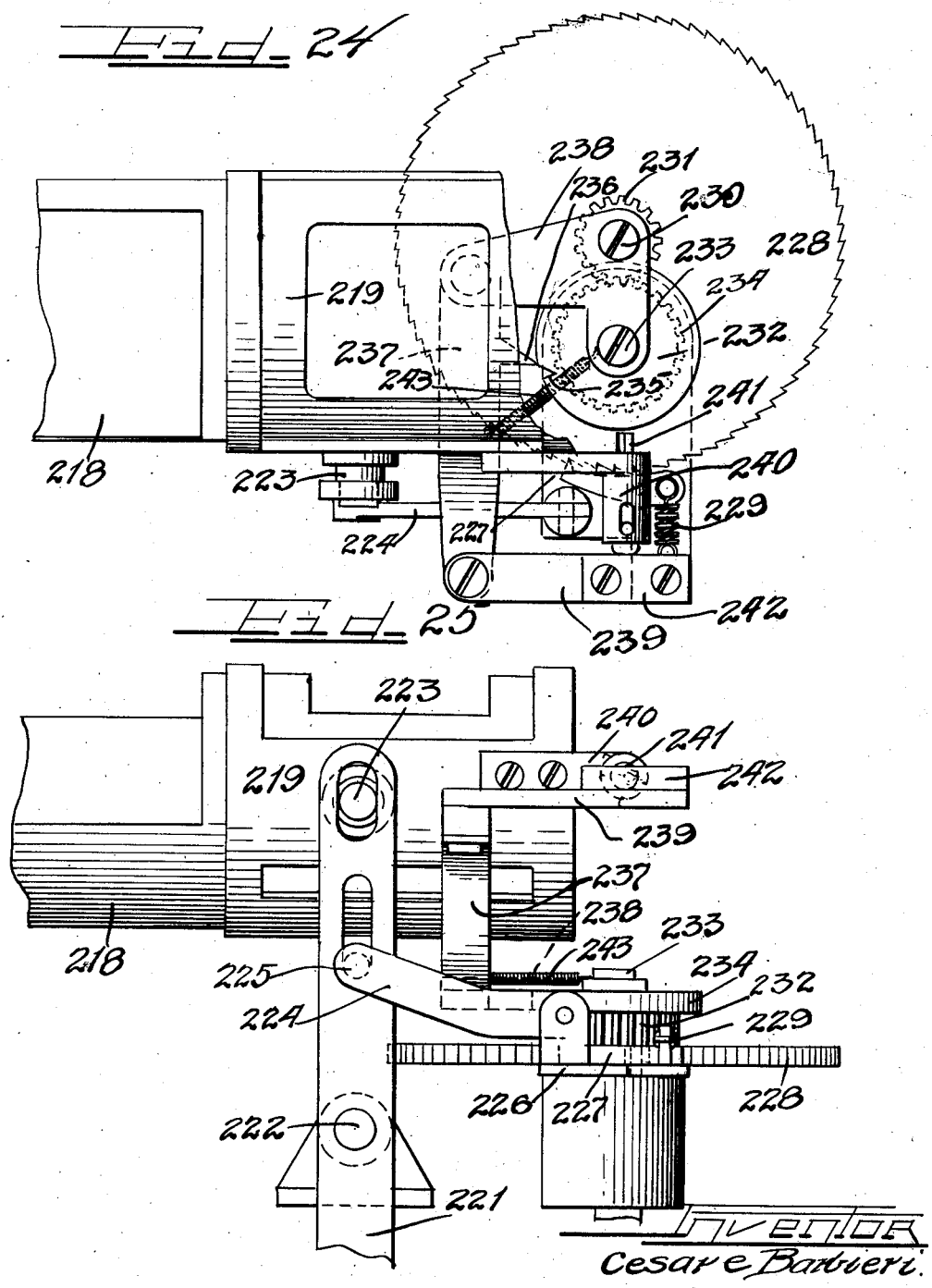

Patented Apr. 23, 1940

2,197,782

UNITED STATES PATENT OFFICE 2,197,782

CONTAINER MAKING MACHINE

Cesare Barbieri, New York, N. Y., assignor to Dixie-Vortex Company, Chicago, Ill., a corporation of Delaware Application September 25, 1937, Serial No. 165,662

29 Claims. (Cl. 93—36.2)

This invention relates to improvements in container making machines, and also to a new and novel method of making containers, the invention being highly desirable for use in connection with the manufacture of containers of the character of drinking cups, ice cream holders and similar devices made of paper or equivalent material sufficiently economical to warrant disposition of the container after a single usage, although the invention may have other uses and purposes as will be apparent to one skilled in the art.

In the manufacture of containers, such, for example, as paper drinking cups, economy of production is substantially an essential. Of course, final economy may be reached through several different mediums, such as economical production, small stock wastage, economical handling, etc. Another factor in economy of production, however, and an important factor is speed of production. Several separate factors contribute to speed in production. It has been found that speed is increased by feeding the stock in a ribbon into the machine, and striking blanks from the stock ribbon contemporaneously with the forming of a blank into container shape. Obviously, the stock feeding mechanism and the forming mechanism are driven, and these mechanisms may be driven up to a certain speed with efficiency, but upon passing a reasonably high speed, efficiency is lacking since the material is not handled a sufficient length of time to insure the making of a perfect container. Of course, the forming mechanism must be driven at a higher rate than the feeding mechanism, in the event the latter operates continuously, and in the event the feeding mechanism operates intermittently, the delay between successive advances of the stock strip is dependent upon the speed of the forming mechanism.

Where only one mandrel is used in such a machine, the delay is material, since less time is required to strike a blank from the stock strip than is required to form the blank, especially if during the forming of that blank it is to be given certain extra operations to provide special formations on the finished container. For containers of the type of paper drinking cups, it is desirable to have the blank completely severed from the stock strip prior to the actual forming operation, and accordingly, in utilizing a machine having a plurality of forming members, blanks may be successively severed from the stock strip with great rapidity and fed immediately in successive order to the various forming members as they successively reach the initial position for receiving a blank. I am not aware that in the past there has been a machine capable of feeding a substantially continuous stock strip through the machine, striking off successive blanks from the forward end of the stock strip, and feeding these blanks to a plurality of forming members traveling orbitally or planetarily.

Such a machine is an important object of the present invention, and it will be seen that with the use of a sufficient number of forming members, containers may be accurately made at a considerably greater speed than has been possible heretofore.

Another object of the invention resides in the provision of a machine capable of making containers accurately and at a considerable speed, and also providing the container with a special formation to enhance the use of the container.

A further object of the invention is the provision of a machine for very accurately and rapidly making paper containers of the nature of drinking cups, and providing each of the containers with a plurality of special formations to enhance their later usage, without detracting in any manner from the speed of making the containers.

Also an object of the invention is the provision of container making means for forming containers from paper or a similar substance carrying a thermoplastic, which machine not only forms the container, but provides certain added formations to the container and temporarily heats the container at the time these added formations are developed, so as to rely upon the thermoplastic to ultimately maintain the shape of said added formations.

A further feature of the invention is the provision of a machine for making conical containers, such as conical paper drinking cups, with a blunted apex.

It is also an object of the invention to provide means for making a container of the nature of a conical drinking cup, with a drinking rim formed thereon.

The invention also contemplates the provision of a machine for making paper containers of a conical character, and contemporarily heating either or both of the blunted apex and drinking rim substantially at the time of forming the same, so as to temporarily melt the thermoplastic carried by the paper and permit this thermoplastic to reset with the paper in its new position and ultimately aid the paper in holding its new shape.

Still another object of the invention is the provision of a container making machine incorporating an entire series of forming mandrels or the equivalent which are continuously driven, both around their own axes and orbitally or planetarily, and which machine cuts blanks from a substantially continuous stock strip and feeds the blanks to the continuously moving mandrels.

Another feature of the invention is the provision of a machine in which a blank is severed completely, with no later trimming operations necessary, from a substantially continuous sheet of stock, fed to a forming element, ironed while on the element, provided with a drinking rim, provided with a blunted apex, and discharged from the forming element in time for the same element to pick up a new blank, the feeding mechanism having acted in the interim.

It is also a feature of the invention to provide a machine utilizing a turret wheel or equivalent translating element carrying a plurality of mandrels continuously driven, and utilizing what might be termed a stock ribbon feed, from the forward end of which blanks are successively severed and fed to the continuously moving mandrels.

Of course, the invention contemplates the making of a paper container or the like with a minimum waste of material.

The invention also seeks the provision of a new and novel method of making a container.

While some of the more salient features, characteristics and advantages of the present invention have been above pointed out, others will become apparent from the following disclosures taken in conjunction with the accompanying drawings, in which:

Figure 1 is a fragmentary plan view of the stock strip utilized in the invention and illustrating diagrammatically the manner of severing a blank from the strip;

Figure 2 is a fragmentary view, illustrating diagrammatically the start of the forming operation;

Figure 3 is a side elevational view of a partially formed container;

Figure 4 is a side elevational view of a finished container;

Figure 5 is a plan view of the finished container of Figure 4;

Figure 6 is a fragmentary top plan view of the machine embodying principles of the present invention and capable of making the container shown in Figures 4 and 5;

Figure 7 is an enlarged fragmentary vertical sectional view taken substantially as indicated by the line VII—VII of Figure 6;

Figure 8 is an enlarged transverse vertical sectional view, with parts omitted, taken substantially as indicated by the line VIII—VIII of Figure 6;

Figure 9 is a fragmentary plan view, illustrating the blank cutting mechanism, taken substantially as indicated by the staggered section line IX—IX of Figure 7;

Figure 10 is a top plan view of the punch block, showing the punch die in dotted lines, for severing a blank from the stock strip;

Figure 11 is a vertical section through both the punch block and punch and the die block and die;

Figure 12 is an enlarged fragmentary vertical sectional view taken substantially as indicated by the staggered section line XII—XII of Figure 6;

Figure 13 is a fragmentary vertical sectional view taken substantially as indicated by the line XIII—XIII of Figure 6, but illustrating the forming members in elevation;

Figure 14 is a central vertical sectional view through the forming mechanism, with parts in elevation, taken substantially as indicated by line XIV—XIV of Figure 13;

Figure 15 is a fragmentary vertical sectional view taken substantially as indicated by the line XV—XV of Figure 14;

Figure 16 is a fragmentary sectional view, with parts broken away, taken substantially as indicated by the line XVI—XVI of Figure 12;

Figure 17 is an enlarged fragmentary detail sectional view taken substantially as indicated by the line XVII—XVII of Figure 12;

Figure 18 is a fragmentary enlargement of a portion of the structure seen in Figure 12, located in the upper right-hand portion of Figure 12;

Figure 19 is an enlarged fragmentary sectional view, with parts broken away, taken substantially as indicated by the line XIX—XIX of Figure 16;

Figure 20 is a sectional view taken substantially as indicated by the curved section line XX—XX of Figure 18;

Figure 21 is a front elevational view of one of the forming mandrels;

Figure 22 is a central vertical sectional view through one of the forming mandrels and associated structure;

Figure 23 is an enlarged fragmentary vertical sectional view taken substantially as indicated by the section line XXIII—XXIII of Figure 14;

Figure 24 is a fragmentary plan view, with parts broken away, of the receiving device and associated counting mechanism; and Figure 25 is a fragmentary side elevational view of the structure seen in Figure 24.

As shown on the drawings:

By way of presentation, the illustrated embodiment of the present invention discloses a machine for making a container in the nature of a paper drinking or ice cream cup of substantially true conical shape initially, which container is provided with a drinking rim formation somewhat in the nature of a flare or outwardly disposed lip, and a blunted apex. Of course, the container may be made purely conical, if so desired, as illustrated in Figure 3; but it is preferable to provide the drinking rim and blunted apex, as shown in Figures 4 and 5. The apex may be blunted by suitable tools in the nature of those disclosed, only by way of illustration, in my copending application for Letters Patent entitled "Method of and process for forming paper cups", filed May 9, 1936, Serial No. 78,812, and likewise, the drinking rim may be provided by tools of the nature of those shown, merely by way of illustration, in the same copending application.

It will be noted that the machine forms the containers in substantially perfect condition with very great rapidity, the extra operations being incorporated without slowing up the process of manufacture, since the machine is especially designed to accommodate these extra operations at considerable speed. It will further be noted that the containers are not limited as to size, since it is an obvious expedient to size the forming members and associated parts of the mechanism which directly contact the stock strip, blank or container to accommodate a large or small container, as may be desired.

The method in general

In general, the method incorporated in the present invention includes the intermittent feeding of a substantially continuous strip of stock from a suitable source, such, for example, as a roll of paper of the character used in making paper drinking and ice cream cups and the like, which paper may be either of the dry-wax or wet-wax type.

The paper is intermittently fed into position for severance of a blank from the leading part of the stock strip. The blank is severed in complete outline, so that no further or subsequent trimming operations are necessary. The severance, of course, is done so as to take advantage of as much of the strip of stock as possible, reducing wastage to a minimum. Prior to the severance of the blank, the stock strip is provided with spaced stripes of suitable adhesive or glue, and the strip is cut between these spaced stripes of adhesive, so that each successive blank carries sufficient adhesive when cut to maintain the container in shape.

Contemporaneously with the severance thereof, the blank is gripped by a suitable forming member and formed into conical shape. During the forming operation, the blank is ironed by a sliding contact and pressed by a rolling contact. A plurality of forming elements are utilized, these elements operating continuously both about their individual axes and also in a translatory or orbital path. The severance of each successive blank is, of course, timed so that the blank will be severed contemporaneously with the arrival of the next forming element in position to receive the blank.

During the forming operation, a drinking rim is provided on the container, and the adjacent portion of the stock is preferably heated temporarily during the forming of the drinking rim, so as to melt for a brief moment the thermoplastic carried by the paper. This thermoplastic is permitted to harden or reset immediately upon the formation of the drinking rim, so that subsequently the thermoplastic carried by the paper will aid in maintaining the drinking rim in shape, permitting the finished container to be dispensed from a pull-type dispenser having no movable parts, without noticeable injury to the drinking rim. Contemporaneously with the forming of the drinking rim, the apex of the container is blunted, the blunting operation occurring in the immediate and definite apexial region of the container so as merely to eliminate the sharp point resulting from forming the blank into conical shape. This operation may also be performed with a temporary application of heat, if so desired.

After each container is thus completely formed, it is automatically discharged from the forming element into nested relationship with preceding containers, and as the containers are thus discharged into stacked relationship, each is counted and each predetermined number of containers is indicated by a suitable mark in the resultant stack.

In Figures 1 to 5, inclusive, I have illustrated, somewhat diagrammatically, the general procedure in the forming of the container. As a stock strip 1 is fed through the machine, it is provided with spaced stripes 2 of a suitable adhesive. When it reaches cutting position, a blank 3 is struck from the leading part of the stock strip. The blank is cut complete, although two successive operations of the cutting mechanism are necessary to sever a blank. The cutting die mechanism and stock wastage is of the shape indicated at 4, and it will be noted that the cutting occurs between adjacent adhesive stripes 2, so that a full stripe is left upon the severed blank. Each stroke of the die mechanism cuts the rear portion of the first blank and the forward portion of the next blank.

The blank itself is generally of a sector-shape having a curved edge 5 for defining the mouth of a container and a pair of converging side edges 6 and 7, respectively. The side edge 6 preferably coincides with the edge of the stock strip so as to reduce wastage. The outer portion of the side edge 7 is preferably straight to provide an area easily gripped by the forming mandrel, and inside this straight portion the edge is inwardly arcuate so that the blank may be readily wound around the mandrel without losing its proper position and without causing a buckling of the paper. Between the side edges 6 and 7, a projecting tab 8 of generally curved outline is provided which is wrapped around the apexial region of the finished container to insure a waterproof seal in the event a drinking cup is being formed and to provide a suitable tear tab in the event an ice cream cup is being formed. The inner portion of this tab is not provided with adhesive, so that when the container is formed, this marginal portion near the apex is permitted to spring away from the body of the container and thus aid in keeping the containers separated when in nested relationship.

Contemporaneously with the cutting of the blank, the marginal portion adjacent the straight part of the side edge 7 is gripped by a suitable forming element, such as the mandrel 9, and the blank is wound around the mandrel into the conical shape seen in Figure 3. After the winding of the blank, a drinking rim 11 is formed on the cup in the manner above described, and the apex is blunted, as indicated at 12 in Figure 4. The blank is wound substantially convolutely to form the container, and the marginal portions adjacent the side edges are overlapped to provide a seam 13 held intact by the aforesaid glue stripe 2.

The machine in general

The machine in general includes a hollow bed 14 containing some of the driving mechanism to be later described, and the top of which is provided with suitable openings where needed to accommodate the various operating parts. A plurality of super-frame structures are mounted upon this hollow bed. These super-structures include a box-like frame 15 carrying the final feeding mechanism and the cutting mechanism. Preferably integral with this frame 15 is a laterally extending bracket 16 (Figures 6 and 8), which supports a part of the drive mechanism.

Attached in any desirable manner to the frame 15 is another box-like frame 17 (Figure 7), which carries the initial feeding mechanism and the gluing mechanism.

Positioned at an angle to the frame structures just described, as best seen in Figures 6 and 14, are several other frame members, including an upstanding support 18 also resting upon the hollow bed 14. This upright 18 together with a rearward frame structure 19, carrying preferably integrally a housing 20 for the turret wheel to be later described, supports the forming means and associated mechanism, including the drinking rim forming means. Situated to one side of the upright 18 is an upright bracket element 21 (Figure 12) which aids in supporting the apex blunting means.

It will be appreciated that the various frame structures above mentioned will be fabricated and shaped to adequately support the various parts of the machine, and suitable journal and bearing means will be associated with the frame member to accommodate the various shafts, all in a manner to meet the exigencies of the particular constructions. Accordingly, it is not necessary herein to specifically describe every angle and formation of the frame structure, and mention the bearings, journals and the like for the various shafts, since such structures are illustrated and their respective functions known without specific explanation.

*The major shafts and drive mechanism*

The entire machine is preferably driven from a single source, not shown in the drawings, which may be an electric motor or the equivalent. The drive source is connected through a suitable belt 22 or other suitable means to a drive wheel 23 carried by a shaft 24 (Figure 14). With reference to Figure 13, it will be seen that the shaft 24 carries a gear 25 which is the drive gear proper for the machine. The relatively small gear 25 meshes with a larger gear 26 carried by a shaft 27.

Keyed to the shaft 27 so as to rotate with it and the aforesaid gear 26 is a disk 28. This disk has a groove 29 defined in the face thereof which receives a rectangular block 30 journaled for rotation on a pin 31 fixed in a second disk 32 carrying a gear 33 and keyed to a shaft 34. It will be noted that the pin 31 is disposed eccentrically both with reference to the block 30 and the disk 32, and that the shaft 34 is out of axial alignment with the shaft 27. Thus, a peculiar, variable motion drive is effected, in which the shaft 27 will drive the shaft 34 and likewise the gear 33 at variable speeds but with continuous movement. While the shaft 34 rotates continuously, it will at times rotate much slower than at other times. This particular movement is more fully explained and described in my issued United States Letters Patent No. 2,049,418, entitled "Cup machine", dated August 4, 1936.

The gear 33 meshes and drives a large gear or turret wheel 35 which carries a plurality of cup-forming means. By way of the drive above explained, the cup-forming means will be driven slower at the time a former or mandrel picks up a blank than during the time the blank is being formed around the mandrel. This large gear or turret wheel 35 is mounted for free rotation around a fixed shaft 36 carried in fixed position by the aforesaid frame structures 18 and 19.

With reference more particularly to Figures 8, 9, 12 and 13, it will be seen that the shaft 27 carries a bevel gear 37 at the opposite end thereof, in mesh with a bevel gear 38 carried by a shaft 39 which is thus driven continuously from the shaft 27. Through the agency of a pair of angular gears 40 (Figures 8 and 9), the shaft 39 continuously drives a shaft 41, and this shaft 41, by way of a pair of bevel gears 42, a vertical shaft 43, and a pair of bevel gears 44, continuously drives a parallel shaft 45. The operations of the gluing mechanism, the final feeding mechanism, and the cutting mechanism are all controlled by the continuously driven shaft 45 in a manner to be later described.

With reference to Figures 7 and 8, it will be seen that the shaft 41 carries a sprocket wheel 46 which, through a suitable chain 47 engaged by another sprocket wheel 48, drives a shaft 49. The initial feeding mechanism is responsive to the continuously driven shaft 49.

With reference now to Figures 12 and 16, it will be seen that on its outer end the shaft 39 carries a gear 50 in mesh with a similar gear 51 on a suitable stub shaft 52. The gear 51 is fixedly associated with a cam 53, and the rotation of this cam governs the operation of the apex blunting mechanism as will more fully appear later herein.

It will be appreciated that the respective gears and drive mechanisms are so constructed and timed that each operation of the machine occurs at the precise moment relatively to preceding, contemporaneous and subsequent operations.

*Initial feeding mechanism*

The initial feeding mechanism is best seen in Figure 7. This mechanism includes a pair of feeding rollers 54 and 55, respectively which feed the stock into the machine from a suitable source, such as a roll of paper, not shown in the drawings. The roller 54 is driven through suitable gearing from the roller 55 which in turn is driven by a suitable sprocket chain 56 from a gear and sprocket wheel 57 on the same shaft and actuated by a gear on the same shaft with the aforesaid sprocket wheel 48. An idler roller 58 maintains a suitable tension on the stock strip 1, and a secondary feeding roll 59, geared to the aforesaid gear on the shaft of the sprocket 48, advances the strip upwardly into the machine, the strip being held tightly against the roll 59 by another idler roller 60. After leaving the rolls 59 and 60, the strip passes over a pair of rolls 61 and 62 carried by a bell crank 63 pivoted about the shaft of the roll 62 and urged by a spring 64 into such position that the roll 61 holds the stock strip against a gluing roller to be later described.

Ready means are provided to permit the stock strip to be first fed into the feeding mechanism above described. It will be noted that the feeding roller 54 is carried on a support 65 pivoted as indicated at 66. Adjacent this support and journaled in the frame 17 is a shaft 67 supplied with any suitable form of actuating handle. This shaft 67 has a cut-away portion, as indicated at 68, in which the support 65 may rest. It will be noted that when the shaft 67 is turned, the support 65 together with the roller 54 will be elevated to permit the stock strip 1 to be placed between the rollers 64 and 55. Of course, a similar support 65 is preferably on the opposite wall of the frame 17 at the other end of the roller 54.

By this initial feeding mechanism, the stock strip 1 is continuously advanced from the source and passes through the gluing mechanism to the intermittently driven final feeding means. The final feeding means, while operating intermittently, operate at a greater rate of speed than the initial feeding means, so that undue slack does not occur in the stock strip.

*Glue mechanism*

The gluing mechanism includes a glue pot 69 mounted upon the frame portion 17, and having a pivoted cover 70 to afford access to the interior of the pot. Inside the pot is a glue-applying wheel 71 projecting through an opening in the wall of the glue pot to contact a gluing wheel 72 (Figures 6 and 7). This gluing wheel 72 is provided with a pair of opposed notches 73, so that the glue will be applied to the stock strip in the aforesaid spaced stripes 2.

The gluing mechanism is intermittently driven from the shaft 45. With reference to Figures 6, 7 and 8, it will be seen that the shaft 45 carries a mutilated gear 74 arranged to intermittently operate a shaft 75 through a smaller gear 76 carried by this shaft. Another gear 77 also carried by the shaft is in turn in mesh with a larger gear 78 engaged with a similar gear 79 carried by the same shaft as the glue wheel 72. As indicated at 80, similar gears establish a driving connection between the glue wheel and the glue-applying wheel 71.

Final feeding mechanism

The final feeding mechanism includes a pair of intermittently driven rollers 81 and 82, respectively, the roller 81 being carried on the aforesaid shaft 75, and the roller 82 on a shaft 83 which is in turn supported in a pair of arms 84 pivoted as indicated at 85 (Figure 7). When the paper is threaded through the machine at the start, the feed roll 82 is lowered by means of a recessed shaft connection 86 similar in operation to that of the shaft 67 which elevates the aforesaid shaft support 65 for the initial feeding roll 54. Any suitable means, such as a pair of springs 84a or the equivalent, may be used to maintain the feeding roll 82 in elevated position against the underside of the stock strip during operation.

The upper feed roll drives the lower feed roll through a gear connection, indicated at 87 in Figure 8, each of the shafts 75 and 83 carrying a similar gear. The upper feed roll is notched, as indicated at 88, to prevent contact with the successive glue stripes 2 on the stock strip, and also to provide an operating space for the control cam of the cutting mechanism.

Cutting mechanism

The blank severing or cutting mechanism is best seen in Figures 7, 9, 10 and 11. This mechanism includes a housing 89 formed integral with and attached in any suitable manner to a cross portion of the frame structure 15. Within this housing a punch block 90 may reciprocate. The lower portion of the punch block is expanded, as indicated at 91, and at substantially opposite portions apertured ears 92 are provided which extend beneath and laterally beyond the lower part of the housing 89 for engagement over suitable guide rods 93. On its under face, the punch block carries a punch die 94 having the general configuration indicated by the dotted lines 95 of Figure 10, which corresponds in shape to the stock wastage 4 shown in Figure 1. Mounted on the frame structure 15 beneath the punch die is a suitable die block 95 supporting a female die member 96 apertured and of a corresponding shape to receive the punch die 94. The die block 95 is also apertured as at 97 to permit free passage of the stock wastage 4. As stated hereinabove, after an initial cut has been made on the stock strip, each subsequent down-stroke of the punch die severs a complete blank from the stock strip.

Reciprocation of the punch block is controlled by a suitable cam 98 carried by the aforesaid continuously driven shaft 45. This cam is provided with an internal cam groove including an idling part 99 and an actuating hump part 100. A suitable rider roll 101, carried by a crank 102 fixed at its opposite end to a pivot shaft 103, rides the cam groove and actuates the pivot shaft in accordance with the contour of the groove. Another crank arm 104, also fixed to the pivot shaft, projects in the opposite direction through a suitable aperture in the housing 89 and extends into a socket 105 in the punch block. Accordingly, with every revolution of the shaft 45, a complete blank is severed from the stock strip, and consequently a container is finished and discharged from the machine.

Blank forming mechanism

The blank forming mechanism is best seen in Figures 6, 12, 13, 14, 15, 21, 22 and 23. The main part of the forming means comprises a plurality of the aforesaid mandrels 9, in this instance six, carried by the aforesaid large gear or turret wheel 35 which rotates on the fixed shaft 36. Each mandrel has associated therewith a drinking rim former and a presser cone together with operating mechanisms for each, and these structures are associated with the turret wheel adjacent the mandrels, the turret wheel having a plurality of thickened portions 106 (Figures 13 and 14), to accommodate the various structures.

Each of the mandrels 9 is journaled in a fixed bearing 107 carried by the turret wheel, and accordingly the mandrel moves in a planetary or translatory path with the wheel. The mandrel also rotates continuously about its own axis, caused by a gear 108 (Figure 14) carried on a hollow sleeve 109 (Figure 22) in the mandrel, meshing with a stationary gear 110 in the housing 20 for the turret wheel. As the turret wheel rotates, the gear 108 of each mandrel rides around the stationary gear 110. The turret wheel, being driven through a variable speed cycle, as above explained, causes the mandrel to also be driven through a similar variable speed cycle about its own axis.

With reference to Figures 21 and 22, it will be seen that each mandrel 9 comprises a fabricated conical portion 111 fixed to the aforesaid hollow sleeve 109. This portion 111 is substantially of a true conical shape with the exception of a blunt apex 112. When the blank is initially wound around the mandrel, it is formed into a substantially true cone, and the blunt portion 112 on the mandrel permits the apex of the finished container to be blunted in a manner more fully described later. The mandrel is provided with a slot 113 in the side thereof to receive the aforesaid portion adjacent the edge 7 of the blank, and a pair of grippers 114 firmly hold this marginal portion of the blank in the mandrel. The grippers are connected for rotation with a hollow shaft 115 which is the main shaft of the mandrel. This shaft is made hollow to permit a blast of air to be passed therethrough in order to eject the finished container from the mandrel, the conical portion 111 of the mandrel having a plurality of openings 116 in communication with the hollow in the shaft.

With reference to Figure 14, it will be seen that the hollow shaft 115 of the mandrel projects beyond the gear 109 and terminates in a flange 117 for rubbing contact with an air connection at the time the finished container is to be discharged from the mandrel. During operation, the paper is fed to the mandrel, gripped thereby, wound therearound, and formed into a container, and after all of the operations have been performed on the container, as the mandrel reaches discharge position in its translatory path, the grippers are released and a blast of air is passed through the hollow shaft or axle of the mandrel to eject the finished container therefrom.

The grippers are actuated by a mechanism of the character more fully shown and described in my issued patent entitled "Rotary cup machine", No. 2,049,417, dated August 4, 1936. This mechanism includes a disk 118 (Figures 14 and 23) carried by the hollow axle 115 of the mandrel. Also fixed to the shaft 115 is a crank arm 119 having a gear segment 120 thereon, and a portion of the gear segment is formed straight, as indicated at 121. Another crank arm 122, having a gear segment 123, is pivoted to the disk 118 at a different level than the crank arm 119. The disk is also provided with a cam slot 124 in which a roller 125, carried by a spring-urged pawl 126, is normally seated. This pawl also carries a roller 127 thereon which engages behind the straight surface 121 on the arm 119 to hold the two arms in open position against the action of the spring (not shown) which tends to hold the pawl normally in the position seen in Figure 23. When the roller 127 is engaged with the edge 121, the grippers are in open position, and when the structure is in the position seen in Figure 23, the grippers are closed.

The arms 119 and 122 are actuated by suitable structure including a cam holder plate 128 (Figures 14 and 15) bolted to a plurality of bosses or studs 129 carried by the frame structure 19. On the outer or rear face thereof, this cam plate carries a projection 130 which contacts the crank arm 122 as the latter passes thereby and moves the grippers to open position just before the flange 117 merges with a plate 131 connected with an air line 132. This is the discharge position of the mandrel, and as soon as the grippers are opened and connection is established with the air line, the finished container is ejected from the mandrel. The mandrel remains in open position until it reaches another projection 133 on the cam plate, and this projection contacts the arm 119 and causes the grippers to be moved into closed position immediately after the mandrel has received a new blank for forming.

The blank is wound around the mandrel beneath a presser cone 134, best seen in Figures 6, 12 and 13. The presser cone is mounted for rotation in a crank arm 135, the other end of which is fixed to a shaft 136 (Figure 6) journaled in a suitable bearing 137 (Figures 12 and 14) bolted to the turret wheel 35. A pair of springs 138, each having an end secured to the arm 135 and the other end to a suitable point of anchorage, normally holds the presser tightly engaged against the blank on the mandrel, the presser cone 134 being free to rotate with the mandrel. The presser cone is preferably in the shape of a true cone, and therefore will project slightly beyond the end of the mandrel, as seen best in Figure 6.

Of course, the presser cone must be elevated or pivoted away from the mandrel periodically, to permit the apex of the container to be blunted and also to permit the finished container to be ejected from the mandrel. To this end, another crank arm 139 is attached to the opposite end of the shaft 136, and the free end of this crank arm is in abutment with a plunger 140 reciprocable within a cylinder 141 carried by the turret wheel. Inside the cylinder (Figure 14), the plunger is shouldered, and a coil spring 142 urges the plunger outwardly away from the end of the crank arm 139. The plunger projects through the opposite end of the cylinder and carries on this end a yoke 143 between the arms of which a transversely disposed tapered cam roller 144 is mounted. The cam roller is merely for the purpose of reducing friction when it contacts with a pair of cams 145 and 146 carried by the aforesaid cam plate 128 (Figure 15). As the particular mandrel reaches a point opposite the cam 145, the roller 144 contacts this cam, rides up over the raised surface of it, and forces the plunger rearwardly against the action of the spring 142, causing the plunger to move the crank arm 139 and pivot the presser cone away from the mandrel. At this particular point of the translatory movement of the mandrel, the presser cone is elevated to permit the apex of the container to be blunted. After the blunting operation is completed, the roller 144 rides off the cam and the presser cone springs 138 and the spring 142 return the respective parts to their original position. At the time the finished container is ejected from the mandrel, the roller 144 is riding over the cam 146, and the presser cone is likewise elevated from the mandrel to permit the ejection.

While the presser cone 134 provides a rolling pressure against the blank being formed on the mandrel, this blank is also subjected to an ironing or sliding pressure from just after the time it is received by the mandrel until immediately before it is ejected from the mandrel. The sliding pressure is provided by a stationary ironer comprising a substantially three quarter circular frame 147 held fixedly in position on the shaft 36 by means of suitable fabricated spokes 148. This part of the ironer is preferably of metal, and the ironer may be provided with a suitable, relatively resilient surface 149 which may be either copper covered sponge rubber, leather or some other suitable material of smooth finish against which the blank is pressed by the proximity of the mandrel. The blank continues to ride around the ironer, with the exception that the ironer may be cut away at a proper point to permit blunting of the apex of the cone, only a very small space being needed for this operation.

*Drinking rim forming mechanism and its operation*

The drinking rim forming mechanism is best seen in Figures 12, 13, 14, 15 and 22. This mechanism forms the drinking rim 11, seen in Figures 4 and 22, of the container. The drinking rim forming element, generally indicated by the numeral 150 is slidably carried on each mandrel structure between the respective bearing 107 and the mandrel head, as seen clearly in Figures 14 and 22. Specifically, the drinking rim former comprises a holder 151 and a forming element 152 containing a suitable electrical heating element, so that when the former is applied to the rim of the container, the thermoplastic carried by the paper is temporarily melted. Upon the removal of the former, the thermoplastic immediately hardens or resets, and thereafter aids in maintaining the formation of the drinking rim on the container. The drinking rim is thus strengthened sufficiently so that the containers may be dispensed from a dispenser having no moving parts without noticeable damage to the drinking rim.

The rim former is moved towards and away from the container by means of a crank arm 153 fixedly connected to the protruding end of a plunger 154 reciprocable in a casing 155 carried by the turret wheel 35. As seen best in Figures 12 and 13, the crank arm 153 is of a substantially sector shape, and this crank arm travels rigidly with the reciprocal movement of the plunger 154. This plunger 154 is of the same general construction and is actuated by similar means as the aforesaid plunger 140 which actuates the presser cone 134. Inside the casing 155 is a suitable spring 156 which normally urges the plunger and crank arm 153, and likewise the rim forming unit 150, away from the mandrel. The opposite end of the plunger projects from the cylinder 155 and is provided with a fork 157 carrying a transversely disposed tapered roller 158. This roller, during its course of travel with the turret wheel 35, contacts an elevated cam 159 (Figure 15), and forces the plunger and rim former 150 towards the blank carried by the mandrel against the action of the spring 156. When the roller 158 rides off the cam, the spring restores the parts to their original position. The cam 159 is mounted on the aforesaid cam plate 128 in such position that the rim forming operation occurs substantially concurrently with the blunting of the apex of the container, although the latter operation is completed before the former.
As before mentioned, the part 152 of the rim former is preferably electrically heated. To this end, a pair of stationary contact rings 160 and 161 are mounted on the shaft 36 (Figures 13 and 14). With reference to Figure 13, it will be seen that a pair of conductor cables 162 and 163, respectively, are connected one to each of the contact rings 160 and 161, to establish the usual positive and negative current connections. A pair of suitable brushes 164 and 165, rotatable with the turret wheel 35, bear on the contact rings 160 and 161. Electrical connection is established in any suitable manner between both of said brushes and each drinking rim former, as indicated somewhat diagrammatically by the conductors 166 and 167 leading respectively from the brushes 165 and 164 to the upper rim former 150 in Figure 13. It will, of course, be understood that these conductors from the brushes to the various rim formers will not be exposed in the way illustrated in this figure, this showing merely being for the purpose of illustration, the conductors being concealed in suitable conduits in actual practice.

With reference to Figure 22, it will be seen that the wound blank projects beyond the rear edge of the mandrel, and when the roller 158 strikes the cam 159, the rim former is forced against the mandrel carrying this lip portion of the blank outwardly to form the drinking rim 11.
Of course, the heat of the rim former temporarily melts the thermoplastic carried by the paper, and upon the removal of the rim former, the thermoplastic is permitted to harden with the paper in its new position and thus aid in maintaining the shape of the drinking rim thereof.

*Apex blunting mechanism and its operation*

The apex blunting mechanism is best seen in Figures 6, 12, 16, 17, 18, 19 and 20. This mechanism includes a guide socket 168 formed on the aforesaid frame member 21, in which a rack bar 169 is reciprocable. The upper portion of the hollow bed 14 is apertured to permit the rack bar to extend therethrough, as seen in Figure 16. A link 170 is pivoted to the lower end of the rack bar, and a crank arm 171 is pivoted to the opposite end of the link 170. The other end of the crank arm 171 is keyed to a shaft 172 journaled in a bearing 173 secured to the outer wall of the hollow bed 14 (Figures 12 and 16). At the opposite end thereof, another crank arm 174 is secured to the shaft 172, and this crank arm carries a cam follower in the form of a roller 175 on the free end. This roller 175 seats within a cam slot or recess in the aforesaid cam 53 driven by virtue of the gears 50 and 51. The cam slot includes an idler portion 176 and a hump-like actuating portion 177 (Figure 16). As the cam 53 rotates, the crank arm 174 is caused to turn the shaft 172, and the crank arm 171 in accordance with the variation of the cam slots. The crank arm 171, through the link 170 reciprocates the rack bar periodically as the follower rides the humped portion 177. The rack bar will be in its downwardmost position at the top of the hump and will remain in its uppermost position throughout the idler portion 176 of the cam groove.

With reference to Figures 12 and 18, it will be seen that the reciprocating rack bar 169 oscillates a gear segment 178 which pivots about the stationary shaft 36. Immediately adjacent this gear segment is a carrier arm 179 also pivotal about the shaft 36. The gear segment is provided with a suitable opening through which a lug 180 integral with the carrier arm extends (Figure 18). Mounted in suitable supports on the gear segment are a pair of opposed adjusting screws 181—181 contacting the lug 180 from opposite sides, and by means of which the relative positions of the segment and carrier arm 179 may be varied. These screws contacting the lug 18 obviously cause the carrier arm 179 to oscillate in unison with the gear segment. Outwardly beyond the gear segment, the carrier arm is expanded, as indicated at 182, and in this expanded region an apex blunting unit is mounted, the casing 183 thereof being supported directly by the carrier arm, so that the entire unit oscillates with the carrier arm.

In order to guide the carrier arm in its oscillatory movement and insure a firm backing when the blunting unit is brought into operation, the free end 184 of the carrier arm rides between the walls of a channel member 185 fixedly carried by a transverse stationary shaft 186 (Figure 6). Mounted on the top of the channel member 185 is a housing 187 containing a headed plunger 188 urged downwardly by a coil spring 189. An internal shelf 190 (Figure 19) prevents the plunger from leaving the housing when the carrier arm moves away. This plunger functions as a shock absorber to eliminate jars and vibration, and thus compensate for any lost motion occurrent in the oscillation of the carrier arm by means of the rack bar 169 and cam 53.

The internal mechanism of the apex blunting unit is best seen in Figure 17, and includes a reciprocable, non-rotatable plunger or impacting member 191 shouldered to provide an end portion 192 of smaller diameter having a formation 193 in accordance with the desired apex formation 12 on the finished container. This plunger is normally urged away from the container on the mandrel by means of a suitable bushing 194 and a coil spring 195 or the equivalent. Encasing the plunger and slidable with or relatively thereto, as the case may be, is a reciprocable sleeve 196 having a nose formation 197 shaped to insure proper contact of the unblunted container end with the end 193 of the plunger.

In order to reciprocate the plunger and sleeve, a pair of adjacent studs 198 are threaded into the plunger, as indicated at 199. Each of these studs carries a cam roller 200 outside of the housing 183, the housing being slotted, as indicated at 201 to accommodate the studs and permit the necessary reciprocatory movement thereof. The sleeve is also provided with an aperture 202 for each stud, this aperture being somewhat larger than the body of the stud to permit some freedom of movement between the plunger and the sleeve.

A cam carrier 203 is also fixedly mounted on the stationary shaft 186. Secured to this carrier 203 is a plate 204 carrying an integral cam formation generally indicated by the numeral 205. In the forming of this formation, the plate is initially solid, then a slot is provided in the plate, and that portion outside of the slot is formed into the cam 205. The pair of cam rollers 200—200 ride one on each side of the cam 205, and these rollers following the contour of the cam cause the reciprocatory movement of the apex blunting mechanism.

With the downward movement of the rack bar 169, the gear segment 178, the carrier arm 179, and the apex blunting unit are also carried downward, with the cam rollers 200 riding the cam 205. With reference to Figure 20, it will be seen that this cam includes a sloping portion 206 which moves the plunger 191 and sleeve 196 outwardly to the level of the cam part 207. In this position, the sleeve has received the pointed end of the container in its nose 197, and the end 193 of the plunger or impacting member is substantially in contact with the point of the container. An abrupt shoulder 208 is provided on the cam leading to a straight portion 209. The abrupt shoulder 208 causes the end 193 of the plunger to be quickly jammed into the sharp apex of the container and abruptly crush this apex into the blunted formation 12. While the plunger 191 remains stationary, the mandrel together with the container is constantly rotating about its own axis, and during the travel of the cam rollers 200 over the part 209 of the cam, a fine finish is applied to the blunted end of the container. The part 210 of the cam causes the plunger and sleeve to be moved away from the container apex. As the parts are seen in Figure 17, the blunting operation has just been completed, and in this position the rollers will be riding the part 209 of the cam, while as seen in Figure 20, the blunting operation is about to begin with the initial movement of the plunger and sleeve towards the container apex.

From the relative position of the apex blunting mechanism and the aforesaid control cam 159 (Figure 15) for operating the rim forming mechanism, it will be seen that both these operations occur substantially concurrently, although the rim forming mechanism is in operative position for a longer time than is the blunting mechanism. Of course, the respective gears are timed and the cam 53 is so sized as to permit the apex blunting mechanism to perform its operation on the container carried by one mandrel, moving downwardly along with the mandrel, and then moving upwardly to initial position in time to begin operating on the container carried by the next following mandrel.

As the term "impacting" is used herein and in the appended claims, it is to be understood as including either a sudden, forceful impact, or a gradual, pressing impact.

It will, of course, be understood that if so desired the apex blunting mechanism may be heated in similar manner to the rim forming mechanism, so as to take advantage of the set of the thermoplastic carried by the paper.

*Receiving and counting mechanism*

When the mandrel containing a finished cup or container reaches a position opposite the aforesaid plate 131 on the end of the air pipe 132 (Figure 15), a projection 211 on a wheel 212 (Figures 6 and 8) carried on the outer end of the shaft 41 strikes beneath a lever 213 which is pivotal in a vertical plane around the point 214. This causes the opposite end of the lever 213 to drop, moving downwardly a link 215 and actuating a control 216 for an air valve 217. Such operation permits a blast of compressed air to be blown through the mandrel and out through the openings 116 (Figure 21) in the mandrel, to forcibly eject the finished container from the mandrel into a receiving chute or trough 218 (Figures 6, 12, 24 and 25). The end of this trough nearest the mandrel is provided with a reciprocable sleeve 219, and this sleeve may contain an interior structure, such as a detent, over which the mouth portion of the cup must flex as it passes by. The reciprocation of the sleeve 219 aids in properly stacking the cups in nested relationship within the receiving trough 218.

Reciprocation of the sleeve 219 is caused by a detent or projection 220 on the hub of the bevel gear 38 on the shaft 39 (Figure 12) striking the lower portion of a lever 221 which is pivoted as at 222 (Figure 25). The upper end of the lever is provided with an elongated slot engaged over a stud 223 carried by the sleeve 219, and this end of the lever will be thrown to the left, as seen in Figure 25, thus reciprocating the sleeve. Any suitable means may be utilized, such as a common spring connection, to move the sleeve in the opposite direction.

The counting mechanism is also controlled by the movements of the lever 221. A link 224, pivotally associated with a slot in the lever, as indicated at 225, at one end, and pivotally connected with a plate 226 at the opposite end, responds to the movement of the lever to actuate a pawl 227 carried by the plate and thus rotate a ratchet wheel 228 one notch with each movement of the lever. The pawl is urged into engagement with the ratchet wheel by a suitable spring 229 or the equivalent. The ratchet wheel rotates on a shaft 230, and fixed to the shaft to rotate with the ratchet wheel is a pinion 231. This pinion rotates a gear 232 on a shaft 233 in the opposite direction, and the gear 232 carries a disk 234 having a notch 235 in the edge thereof for the reception of a pointed projection 236 carried by a link 237 pivoted to a bracket 238 at one end and to another link 239 at the other end. As seen best in Figure 12, this link has an oblique portion so that the outer end of the link is elevated above the inner end. Mounted on the sleeve 219 opposite the link 239 is a housing 240 carrying a reciprocable punch or marker 241. In inoperative position, a block 242 on the link 239 rests lightly against the outer end of the marker, as seen best in Figure 24. A spring 243 attached to the link 237 and to the shaft 233 urges the point 236 against the edge of the disk 234 at all times. When the disk rotates to bring the notch 235 opposite the point 236, the spring pulls the point into the notch, causing the link 237 to move the link 239 and snap the marker 241 inwardly until it strikes the edge of a container in the receiver, marking this particular container. Upon the next movement of the ratchet wheel 228, the point 236 is forced out of the notch to again ride the periphery of the disk 234 until the notch arrives in position after a complete revolution.

By properly sizing the ratchet wheel and providing it with a predetermined number of teeth, the marker may be caused to act after a certain number of cups have been installed into the receiver. Usually, the marker will act to mark each 250th container.

With reference to Figure 12, it will be seen that the receiver may be supported in any suitable manner, such as by a bracket 244 mounted to the adjacent frame structure. The receiver may be as long as may be deemed desirable.

Operation

In view of the detailed description hereinabove of the construction and operation of each of the component parts of the entire machine, only a résumé of the operation as a whole is now necessary.

The paper is fed by the continuously driven initial feeding means from the source of stock in a substantially continuous ribbon 1, and past the glue-applying means with the aid of the final feeding means. The glue-applying means applies spaced stripes 2 of adhesive to the ribbon of stock as it passes thereby. The intermittently driven final feeding means, through which the gluing means are also intermittently operated, delivers the forward end of the stock strip to the cutting means which are timed to sever a complete container blank from the forward portion of the stock strip substantially at the time the forward edge of the stock strip is engaged by the gripper in a mandrel. The feeding means then moves the stock strip forwardly, and another blank is severed substantially at the time the edge of the stock strip is engaged by the next mandrel.

Each mandrel is, of course, moving continuously, both in a translatory path defined by the turret wheel 35, and is also rotated continuously by means of the internal gear 110 in the housing 20 about its own axis. The mandrel never stops motion, either rotatively or planetarily, but it is periodically slowed down by the variable speed drive governing the movement of the turret wheel, so that it is moving both planetarily and rotatively at its slowest speed when picking up a blank.

The mandrel immediately speeds up in both its motions, after engaging the blank, and winds the blank around itself beneath the respective presser cone 134. The presser cone insures a bonding of the adhesive on the overlapped marginal portions of the formed blank, and the ironer 147 insures a neat and tightly wrapped container, this ironer tending to circumferentially stretch the stock of the container and hold it in stretched condition until after the adhesive has set. Such a stretching of the container body adds to the rigidity and strength of the finished container.

At the proper time in the translatory path, the cam roller 158 strikes the cam 159 and brings the rim-forming means into operation to provide the drinking rim 11 on the container, it being recalled that the rim-forming means is electrically heated to take advantage of the thermoplastic carried by the container as a medium to later aid in retaining the rim formation. Contemporaneously with the start of the rim-forming operation, the apex-blunting mechanism is brought into operation, this blunting mechanism traveling with the respective mandrel in its translatory path until the blunting operation is completed in the manner above described, and then returning to its original position in time to pick up the next coming mandrel. Just prior to the operation of the blunting mechanism, the respective cam rider wheel 144 strikes the cam 145 and elevates the presser cone away from the mandrel to make room for the blunting mechanism, the presser cone again assuming its intimate association with the mandrel immediately after the blunting operation.

After the completion of the rim-forming and blunting operations, the container is finished, and the mandrel next assumes a position over the air line plate 131, the air valve is automatically opened, and a blast of air is sent through the mandrel to discharge the container into the receiver. Just prior to the discharge of the container, the arm 122 of the disk 118 carried by the mandrel shaft strikes the projection 130, releasing the mandrel grippers.

After the ejection of the container, the mandrel travels a partial revolution with the grippers in open position, until the projection 133 strikes the arm 119 and closes the grippers over the edge portion of a new blank.

As the containers are ejected in stacked nested relationship within the receiver, they are automatically counted, and after a predetermined number of containers have entered the receiver, a mark is made upon the container designating the number in the manner above described. The containers may be removed from the receiver and placed in cartons ready for shipment.

In the event the stock grip becomes jammed, or for any other reason it is desired to operate the machine very slowly until a remedy is effected, the drive means may be cut off, and the machine operated by hand through a wheel 245 on the shaft 24 (Figures 6 and 12), which carries the aforesaid drive gear 25.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. In a container making machine, a conical former for shaping a blank of stock into a container of substantially true conical shape, and an impacting mechanism including a member having a formation complemental to the desired shape of the container apex designed to blunt the sharp apex of the container without materially altering the shape of the container.

2. In a machine for making a container, means for forming a blank of stock into substantially true conical shape, and a blunting mechanism including a plunger movable axially with respect to the container and arranged to reshape the point of the container by crushing in a manner to eliminate sharpness.

3. In a machine wherein a conical container is made from a blank of stock, an apex blunting mechanism including a member having a hollow in the end thereof arranged to crush and round the very point of the conical container.

4. In a machine wherein a conical container is made from a blank of stock, an apex blunting mechanism arranged to reshape the very point of the container to eliminate sharpness, and control means operable to move said mechanism into sudden contact with the container so the reshaping of the point will occur rapidly.

5. In a machine wherein a conical container is formed from a blank of stock on a spinning mandrel, an apex blunting mechanism including a member having an end formation complemental to the desired shape of the container apex arranged to crush the very point of the container while the same is spinning on the mandrel to remove the sharpness of the point, and control means arranged to move said member endwise into contact with the point of the container and then hold said member stationary to iron the point smooth.

6. In combination with a spinning mandrel on which a conical container is formed from a blank of stock, an apex blunting mechanism including a non-rotating member for endwise contact with the very apex of the container while the same is spinning to reshape the apex to eliminate sharpness and smooth the newly shaped portion.

7. In a container making machine, a translatory member, a former carried by said member and arranged for rotation about its own axis to form a conical container from a blank of stock, and an apex blunting mechanism arranged to be brought into operation while said former is being translated and rotated to reshape the very point of the container and smooth the newly shaped part.

8. In a container making machine, a translatory carrier, a container former carried thereby and arranged to form a conical container from a blank of stock, an apex blunting mechanism designed to reshape the point of the container to eliminate sharpness, and means arranged to bring said blunting mechanism into operation at a predetermined point along the translatory path.

9. In a container making machine, a movable carrier member, a plurality of spaced container formers carried thereby along a translatory path, each of said formers being arranged to form a conical container from a blank of stock, an apex blunting unit designed to blunt the apex of the container to eliminate sharpness, means to bring said unit into operation, and said unit being arranged to travel the translatory path with a former and container until the blunting operation is complete and then return to original position in time to engage the container on the following former.

10. In a container making machine, a former arranged to shape a blank of stock into a conical container, means carrying said former along a translatory path, an apex blunting unit adjacent said path designed to reshape the point of the container to eliminate sharpness, and cam means arranged to bring said unit into operation at a predetermined point along said path, said cam means having a formation causing a sudden reshaping of the container apex.

11. In a container making machine, a conical mandrel on which a blank is formed into a conical container, a presser cone riding the blank on the mandrel during the forming operation, apex blunting means designed to reshape the point of the container to eliminate sharpness, means to bring said blunting means into operation at a predetermined time, and means to temporarily elevate said presser cone when the blunting means are operating.

12. In a container making machine, forming means to form a conical container from a blank of stock, a carrier holding said forming means and translating the same through a planetary path, oscillatable means adjacent said carrier and movable therewith for a portion of the path, apex blunting mechanism carried by said oscillatable means, a stationary cam, and rider means on said mechanism riding said cam to bring said mechanism into and out of operative position relative to the container being formed.

13. In a container making machine, a work carrier, a former carried thereby, a rim forming unit movable on the shaft of said former and carried therewith, a fixed arm on said unit, a plunger in said unit, and cam means to periodically actuate said plunger and cause the same to move said rim forming unit into operative position.

14. In a container forming machine, a former on which a blank of stock is shaped into a conical container, a drinking rim forming unit, an apex blunting unit, and means to bring both said units into operation concurrently.

15. In a container making machine, a movable carrier, a former carried thereby through a translatory path, said former being shaped to form a conical container from a blank of material while traveling said path, a drinking rim forming unit, an apex blunting unit, means to bring both said units into operation simultaneously, said units traveling with said former while operating.

16. In a container forming machine, a former on which a blank of stock is shaped into a conical container, a drinking rim forming unit, an apex blunting unit, means to bring both said units into operation concurrently, and heating means to raise the temperature of one of said units during its operation.

17. In a container forming machine, a former on which a blank of stock is shaped into a conical container, a drinking rim forming unit, an apex blunting unit, and means to bring both said units into operation concurrently, said former rotating continuously about its own axis, and said units each being stationary with respect to its own axis to cause an ironing of the resultant formation.

18. In a container making machine, a forming element on which a conical container is shaped from a blank of stock, an apex blunting element in axial alignment with said forming element, means to move one of said elements towards the other, drive means to rotate one of said elements, and means holding the other element stationary during the time the elements are in operative association.

19. In a container making machine, a translatory member, a forming element on which a blank is shaped into a conical container carried along a translatory path by said member, an oscillatable support adjacent said path, means arranged to oscillate said support at predetermined intervals, an apex blunting member carried by said support, and control means timed to move said blunting member into contact with the apex of a formed container during the movement of said support in one direction.

20. In a container making machine, a translatory member carrying a forming element around which a blank is shaped into a conical container, a support arranged for movement in both directions between predetermined points along the path of said members, an apex blunting element having a formation of a shape complemental to the desired container apex shape carried by said support, and control means arranged to move said blunting element into engagement with a container apex when said support moves in one direction and hold said blunting element in inoperative position while the support moves in the opposite direction.

21. In mechanism for blunting the apex of a conical container, a conical member for holding a container, an impacting member having an end formation of a shape complemental to the desired container apex shape, and control means arranged to move one member relatively towards the other to bring the end of said impacting member in contact with the apex of the container.

22. In mechanism for blunting the apex of a conical container, a conical member for holding a container, a blunting member having an end formation of a shape complemental to the desired container apex shape, control means arranged to move one member towards the other to bring the end of said blunting member in contact with the apex of the container, and guiding means associated with said blunting member to insure proper contact between the blunting member and container apex.

23. In combination, a member for holding a conical container, a blunting member in the form of a plunger movable endwise along the line of the axis of the container, said plunger having an end shape complemental to the desired container apex shape, and means to move said blunting member forcibly against the apex of the held container.

24. In combination, a member for supporting a conical container, and blunting mechanism for reshaping the apex of the container comprising a sleeve and a plunger member in said sleeve movable relatively thereto and having an end formation complemental to the desired shape of the container apex, and means to move one of said members towards the other to cause contact between the apex of said container and said plunger member.

25. In combination, a member for supporting a conical container, and blunting mechanism for reshaping the apex of the container comprising a sleeve and a plunger member in said sleeve movable relatively thereto and having an end formation complemental to the desired shape of the container apex, and means to move one of said members towards the other to cause contact between the apex of said container and said plunger member, said sleeve extending beyond said plunger in the direction of the container and shaped to guide the container apex and plunger into proper contact.

26. In combination, a member for supporting a conical container, and blunting mechanism for reshaping the apex of the container comprising a sleeve and a plunger member in said sleeve movable relatively thereto and having an end formation complemental to the desired shape of the container apex, means to move one of said members towards the other to cause contact between the apex of said container and said plunger member, said sleeve extending beyond said plunger in the direction of the container and shaped to guide the container apex and plunger into proper contact, and means to limit the relative movement between said plunger and said sleeve to gauge the amount of deformation of the container apex.

27. In combination, a member shaped to support a conical container, and an apex blunter comprising an impacting tool arranged to move in a direction defined by the axis of said container and having an end formation complemental to the desired shape of the container apex.

28. In combination in a container making machine, a plurality of forming mandrels moving continuously through a translatory path and each rotating continuously about its axis, gripping means associated with each mandrel to engage a blank, feeding means arranged to advance a substantially continuous stock strip to forming position, and cutting means timed to sever a blank from the forward part of said strip as the forward edge of the strip reaches a position to be engaged by said gripping means, but before the forming operation actually begins.

29. In a container making machine, means for forming a container of substantially true conical shape having a relatively sharp apex, and a blunting mechanism including an impacting member having a formation complemental to the desired shape of the container apex arranged to reshape the apex of the container in a manner to eliminate sharpness.

CESARE BARBIERI.